United States Patent [19]

Hill

[11] Patent Number: 4,639,103
[45] Date of Patent: Jan. 27, 1987

[54] REMOTE CONTROL MULTI-POSITION REAR VIEW MIRROR

[76] Inventor: Francis K. Hill, P.O. Box 2059, Wickenburg, Ariz. 85358

[21] Appl. No.: 885,317

[22] Filed: Jul. 14, 1986

Related U.S. Application Data

[63] Continuation of Ser. No. 635,569, Jul. 30, 1984, abandoned.

[51] Int. Cl.$^4$ .......................... G02B 5/08; A47G 1/24
[52] U.S. Cl. ..................................... 350/636; 248/479
[58] Field of Search ............. 350/604, 606, 632, 634, 350/636; 248/477, 479, 485, 487, 495, 496

[56] References Cited

U.S. PATENT DOCUMENTS

| | | | |
|---|---|---|---|
| 2,797,287 | 6/1957 | Prutzman | 350/588 X |
| 3,107,077 | 10/1963 | Lassa | 248/478 |
| 3,204,471 | 9/1965 | Rempel | 350/634 X |
| 3,322,388 | 5/1967 | Budreck | 248/478 |
| 3,469,901 | 12/1966 | Cook et al. | 350/605 |
| 3,879,112 | 4/1975 | Hickey | 350/634 |
| 3,917,212 | 11/1975 | Hadley et al. | 248/487 |
| 4,159,866 | 7/1979 | Wunsch | 350/636 |
| 4,504,117 | 12/1985 | Mittelhauser | 350/634 X |

*Primary Examiner*—John K. Corbin
*Assistant Examiner*—David Lewis
*Attorney, Agent, or Firm*—Herbert E. Haynes, Jr.

[57] ABSTRACT

A multi-position rear view mirror for mounting on a vehicle and configured to provide four separate fields of vision which the vehicle's operator adjustably predetermines to suit viewing requirements. The multi-position mirror is remotely controllable to allow selective positioning thereof to provide desired fields of vision.

19 Claims, 5 Drawing Figures

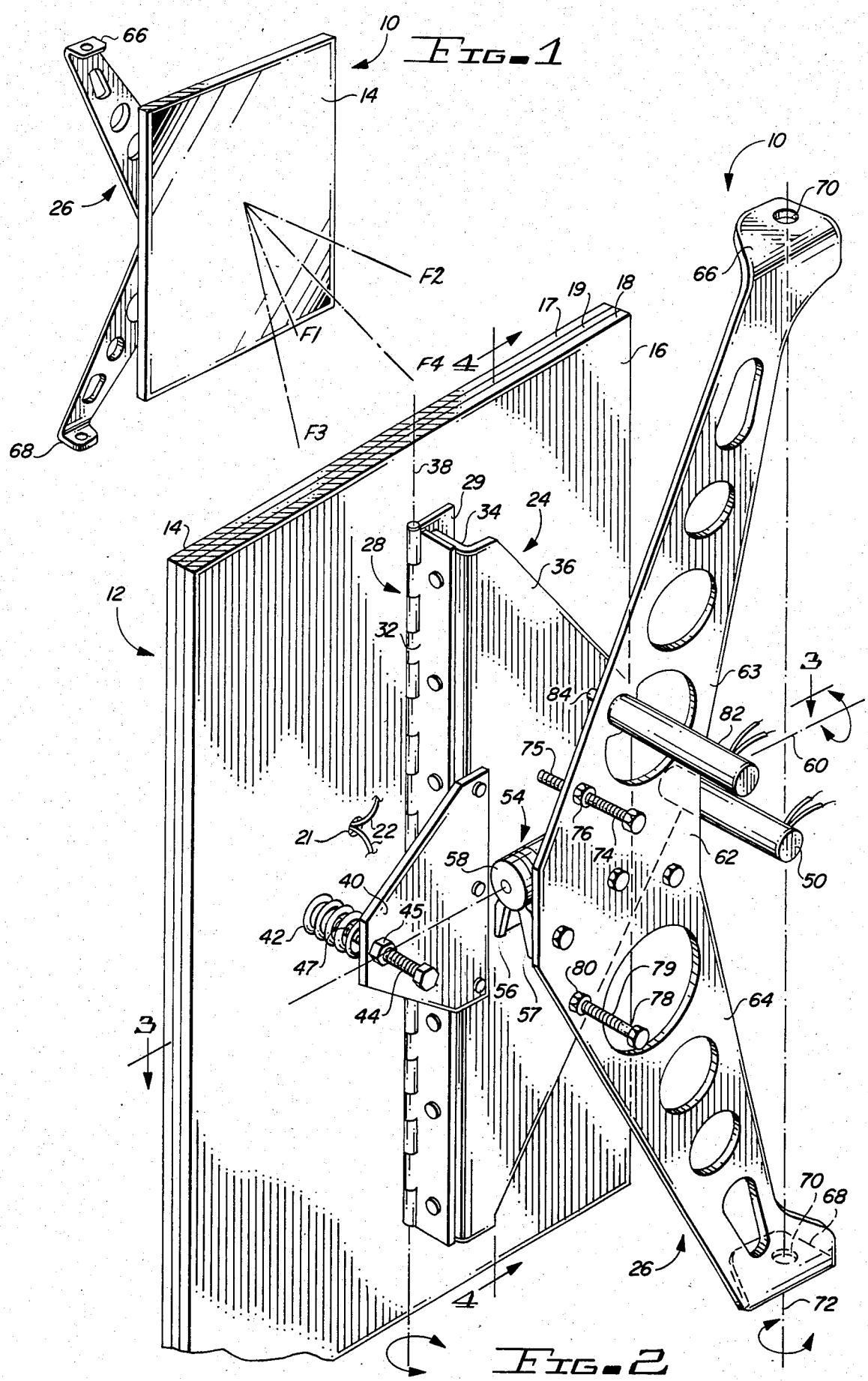

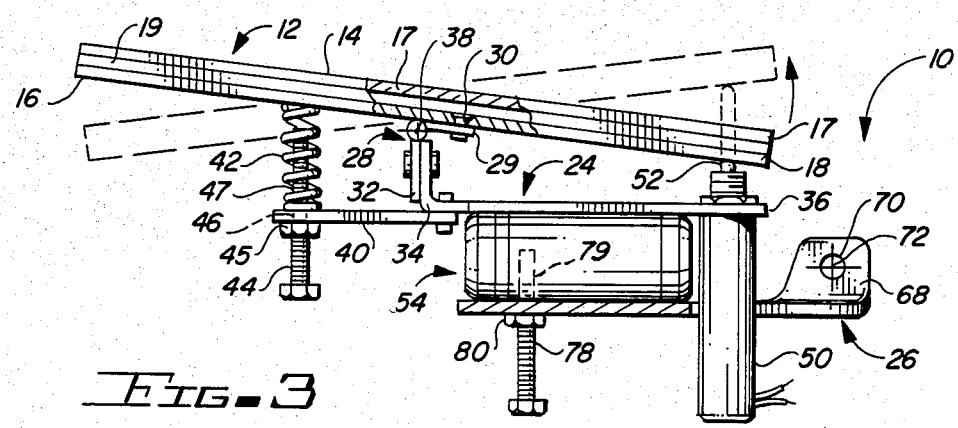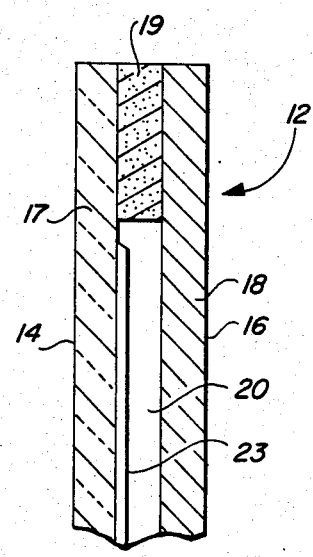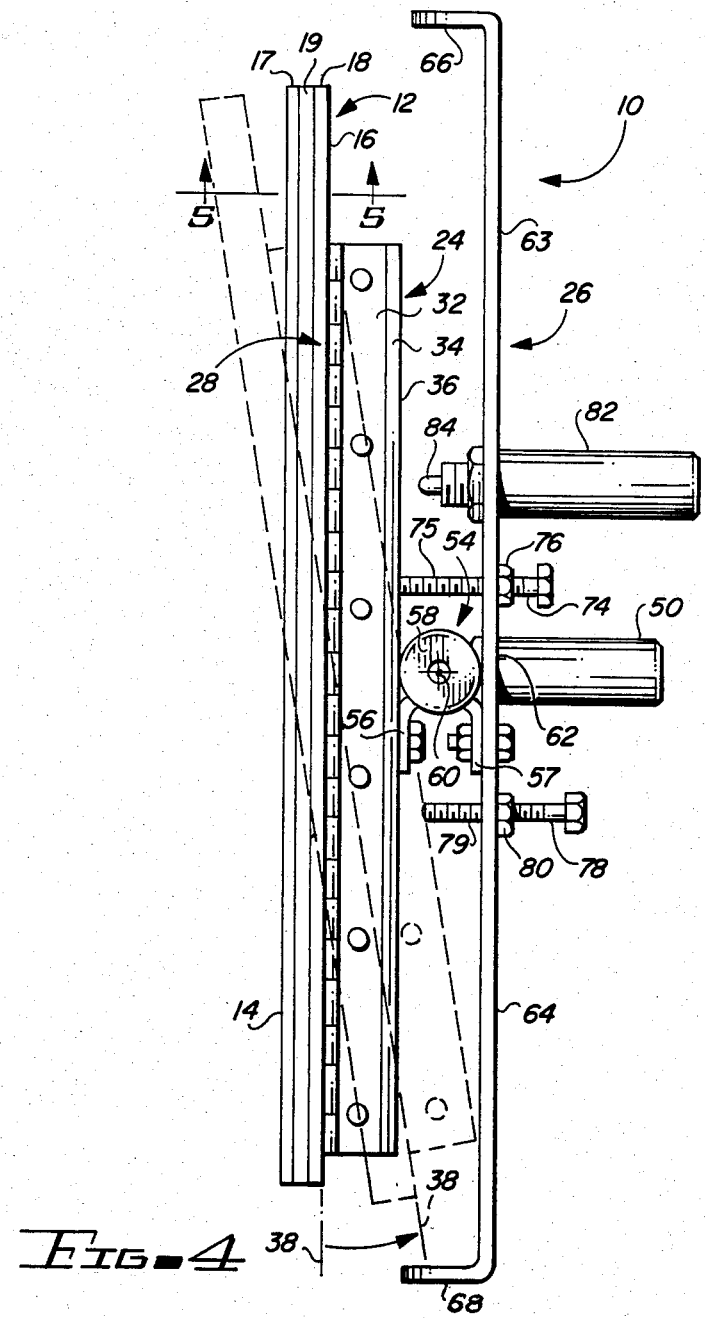

REMOTE CONTROL MULTI-POSITION REAR VIEW MIRROR

This is a continuation of co-pending application Ser. No. 635,569 filed on July 30, 1984, now abandoned.

BACKGROUND OF THE INVENTION

1. Field of the Invention

This invention relates generally to rear view mirrors for automotive vehicles and more particularly to a remote control rear view mirror having multiple pre-adjusted positions and which is particularly well suited for use in relatively large trucks.

2. Description of the Prior Art

As is well known, the rear view mirrors, particularly those provided on the right side of an automotive vehicle, are difficult to adjust for proper viewing and this has resulted in the extensive use of remote control mirrors. Briefly, the mirrors in common usage on passenger vehicles and some light trucks are electrically operated structures which allow the vehicle's operator to adjust the mirror into an infinite number of positions to suit the operator's particular viewing requirements. Usually when an operator gets into a vehicle, he will adjust the mirrors to obtain the proper field of vision prior to operating the vehicle in that it is difficult and dangerous to do so while operating the vehicle. Once the mirrors are adjusted in this manner, they will usually remain in the adjusted position for as long as the same operator is driving the vehicle. Such mirrors may be considered as using the remote adjustment capability as means for pre-adjusting the mirror to a desired single field of vision.

The above described remote control rear view mirrors work very well on passenger vehicles and light duty trucks and are very safe on such vehicles. However, they are inadequate, and sometimes even dangerous when used on large trucks such as the commonly used tractor-trailer vehicles. Such large trucks, due to their height and length, require more than a single field of vision to provide desired operating safety.

The operators of such large trucks have long realized the need for remote control rear view mirrors and several attempts have been made to use mirrors of the above described type. This type of prior art mirror has proven to be dangerous in that it demands the driver's attention while he is accomplishing what may be described as a hunt and seek type of operation, i.e., moving the mirrors while locating the new desired field of vision. And, once he has found it, the mirrors will again demand his attention while he is moving the mirrors to return them to the original, or normal, field of vision. Since an operator cannot watch both the road and the mirrors during such hunting and seeking operations, a dangerous situation occurs each time the operator needs to see a field of vision which is not normally used.

One example of a prior art remote control rear view mirror of the above described type is disclosed in U.S. Pat. No. 2,664,785. This patented device carried the above described operation further by providing means for vertically raising and lowering the mirror and means for adjusting the focal point thereof. This prior art mirror is extremely complicated and did not solve the above described safety problem but instead added to operator distraction.

The remotely adjustable mirror disclosed in U.S. Pat. No. 3,480,355 provided means for rotatably adjusting the mirror about a vertical axis only, and the structure disclosed in U.S. Pat. No. 4,318,590 provides means for automatic scanning movements about a substantially vertical axis. These prior art mirrors, as in the hereinbefore discussed structures, demand the driver's attention and thus are detrimental to operating safety, and in addition, they provide no means for altering the angular disposition of the substantially vertical axis of rotation.

U.S. Pat. No. 3,469,901 discloses a mirror structure which is coupled electrically to the fifth wheel of a tractor trailer so that when the truck is being turned, the mirror will automatically be pivotably moved about a vertical axis an amount which is in proportion to the angular relationship of the tractor and trailer during the turn. This particular prior art mirror is a costly and relatively complex mechanism. It does, however, allow safe operation of the vehicle in that it does not demand the driver's full attention. However, it is limited, as with the prior art structure described above, to rotational movement about a fixed, substantially vertical axis.

Therefore, a need exists for a new and improved remote control rear view mirror which overcomes some of the problems and shortcomings of the prior art.

SUMMARY OF THE INVENTION

In accordance with the present invention, a new and improved remote control multi-position rear view mirror assembly is disclosed which is particularly well suited for use on the right side of large trucks. The multi-position remote control mirror assembly has a mounting mechanism which is configured to provide four pre-adjusted positions that allows the vehicle's operator to remotely switch the mirror from a normal pre-adjusted position to a desired one of three other pre-adjusted positions. Each of the four positions is pre-adjusted by means of the mounting mechanism to suit a particular vehicle and operator and the remote control capability allows the operator to rapidly and accurately switch the mirror back and forth between the multiple pre-adjusted positions to provide four separate and distinct fields of vision. By providing such a remote switching action, as opposed to the prior art hunt and seek actions, the mirror assembly of the present invention can be switched by the vehicle's operator without demanding his attention. In other words, the operator need not look at the mirror during the switching operations.

The mirror of the present invention includes a substantially planar mirror having an especially configured mounting and positioning mechanism attached thereto. The mounting and positioning mechanism includes a mirror bracket which is connected to the rear, or non-reflective face of the mirror, and defines a first substantially vertical axis about which the mirror is pivotably movable relative to the mirror bracket. The mirror bracket is connected to a mounting arm by means of a spring-loaded hinge means which defines a horizontal axis about which the mirror and the mirror bracket are pivotably movable relative to the mounting arm. The mounting arm is configured for attachment to the vehicle and defines a second vertical axis about which the mounting arm, mirror bracket and the mirror are pivotably movable as an entity relative to the vehicle.

The mounting and positioning means further includes a first switching means which interacts with a pair of adjustable stops and the spring-loaded hinge to normally locate the mirror and the mirror bracket in a first position of rotation about the horizontal pivot axis and allows the mirror and the mirror bracket to be selectively actuated to a second position of rotation about the horizonal axis. Thus, the mirror will normally lie in a first substantially upright attitude and can be selectively actuated through a pre-adjusted angle of rotation about a horizontal axis to a tilted second substantially upright attitude. Since the mirror and the mirror bracket are both rotated about the horizontal axis as described above, the first substantially vertical pivot axis defined thereby will move through the same angle of rotation.

The mounting and positioning means further includes a second switching means which interacts with a biasing means and an adjustable stop to normally locate the mirror in a first position of rotation about the first substantially vertical pivot axis defined by the mirror and the mirror bracket, and allows the mirror to be selectively actuated to a second position of rotation about the first substantially vertical axis. That angle of rotation is cooperatively determined by the fixed position of the second switching means and the adjustable stop, and the location of this angle of rotation relative to the vehicle is determined by the rotated position of the mounting arm, and thus the mirror bracket and the mirror, about the second vertical axis defined by the mounting arm.

When the multi-position rear view mirror assembly is in the normal position, the mirror will lie in the first substantially upright attitude and in the first position of rotation about the first substantially vertical axis. In this normal position, the vehicle's operator is provided with a first field of vision. A second field of vision is available to the operator by his remote actuation of the second switching means. This will leave the mirror in the same first substantially upright attitude but will rotate it to the second position of rotation about the first substantially vertical axis. When the mirror is in either of the above described positions wherein it provides either the first or second fields of vision, it may be selectively actuated by the operator to provide third and fourth fields of vision. To arrive at the third field of vision, the mirror will be in the first, or normal position of rotation about the first substantially vertical axis and the first switching means is actuated to move the mirror, and the mirror bracket, into the second, or tilted substantially upright attitude. When the fourth field of vision is desired, the vehicle's operator remotely actuates both the first and the second switching means to locate the mirror in the second substantially upright attitude and in the second position of rotation about the first substantially vertical axis.

Each of the above described four fields of vision can be preadjustably located to suit the viewing requirements of the vehicle and its operator by means of the mounting arm and the adjustable stops as described above. And, the mirror can be left in its normal position or selectively actuated to provide the operator with whatever field of vision he desires without requiring him to look at the mirror, and thus take his eyes off the road during the switching operations.

Accordingly, it is an object of the present invention to provide a new and improved rear view mirror which is particularly well suited for use on the right side of relatively large trucks.

Another object of the present invention is to provide a new and improved rear view mirror which is remotely controlled by a vehicle's operator for switching between four positions each of which provides a separate and distinct field of vision.

Another object of the present invention is to provide a new and improved rear view mirror of the above described character which includes means for pre-adjusting the mirror so that the four positions thereof are pre-set to suit the viewing requirements of the vehicle and the operator so that the mirror can be remotely switched to provide the desired field of vision without demanding the operator's attention during the switching operation.

The foregoing and other objects of the present invention as well as the invention itself, may be more fully understood from the following description when read in conjunction with the accompanying drawings.

BRIEF DESCRIPTION OF THE DRAWINGS

FIG. 1 is a perspective view schematically illustrating the four separate and distinct fields of vision provided by the remote control multi-position rear view mirror of the present invention.

FIG. 2 is an enlarged perspective view of the rear non-reflective surface of the mirror and showing the mounting and positioning means which is attached to the mirror.

FIG. 3 is a sectional view taken along the line 3—3 of FIG. 2.

FIG. 4 is a sectional view taken along the line 4—4 of FIG. 2.

FIG. 5 is an enlarged fragmentary sectional view taken along the line 5—5 of FIG. 4.

DESCRIPTION OF THE PREFERRED EMBODIMENT

Referring more particularly to the drawings, FIGS. 1 and 2 best show the mirror assembly of the present invention which is indicated in its entirety by the reference numeral 10.

The mirror assembly 10 includes a mirror 12 of generally planar configuration which is provided with a reflective face 14 and an opposite non-reflective face 16, as is customary. For reasons which will become apparent as this description progresses, the mirror 12 is provided with the glass sheet 17 which is provided with the silvered coating in the usual manner, or is otherwise treated to provide the reflective properties of the mirror. The treated glass sheet 17 is bonded with any suitable adhesive to a rigid, preferably metallic, backing plate 18 with a peripheral gasket 19 interposed therebetween to provide a dead air space, or cavity 20 therebetween, as seen in FIG. 5. FIG. 2 shows the backing plate 18 as having a hole 21 formed therein through which electrically conductive leads 22 extend. The leads 22 are provided for connection to a suitable source of electric power (not shown) for operation of a heating element means 23 (FIG. 5) provided in the cavity 20 of the mirror 12. The heating element means 23 provides means for defrosting and/or defogging of the mirror 12 in the well known manner.

The mirror assembly 10 further includes the mirror mounting and positioning means which includes the major elements of a mirror bracket 24 and a mounting arm 26.

The mirror bracket 24 includes an elongated hinge means 28 which is preferably of the type commonly referred to as a piano hinge. The hinge 28 has one of its leaves 29 fixedly attached to the rigid backing plate 18 of the mirror 12 such as by means of the rivets 30 in the manner shown in FIG. 3. The other leaf 32 of the hinge 28 is similarly affixed to a flange 34 of a plate 36 and the hinge axis of the hinge 28 provides a substantially vertical, or upright pivot axis 38, the purpose of which will hereinafter be described in detail. The plate 36 is folded over so that the thereof is formed at a right angle with respect to the plane of the plate. A secondary plate 40 is suitably affixed to the plate 36 so as to lie in substantially the same plane and extend oppositely from the folded junction of the plate 36 and its integral flange 34. A coil spring 42 is disposed to extend between the cofacing surfaces of the rigid backing plate 18 of the mirror 12 and the secondary plate 40 of the mirror bracket 24. An adjustable stop bolt 44 having a jamb nut 45 is threadingly carried in a suitable internally threaded hole 46 (FIG. 3) provided proximate the extending end of the secondary plate 40, with the shank 46 of the stop bolt 44 being coaxially disposed within the coil spring 42. Threaded movement of the stop bolt 44 will determined the location of the extending end of the shank 46 which provides means for adjustably setting one of the rotated positions of the mirror 12 about the pivot axis 38 as will hereinafter be described in detail.

As seen best in FIG. 3, a switchin9 means 50 is mounted on the end of the plate 36 which is furthest from the flange 34 thereof with the switching means 50 being disposed so as to be normal with respect to the plate 36. The switching means 50 is provided with an axially extensible plunger 52 which extends from the plate 36 into bearing engagement with the rigid backing plate 18 of the mirror. In FIG. 3, the switching means 50 is shown in the retracted position in solid lines and in the extended position in dashed lines. When the switching means 50 is retracted, the coil spring 42 will pivotably move the mirror 12 about the pivot axis 38 to the solid line position. When actuated to its extended position, the plunger 52 of the switching means 50 will pivotably move the mirror in the opposite direction against the bias of the coil spring 42 and the pivot movement will continue until the mirror 12 comes into contact with the stop bolt 44. The amount of pivotable movement of the mirror 12 is determined by the adjusted position of the stop bolt 44, which determines those two positions of the mirror relative to each other and those two positions of the mirror relative to the vehicle are determined by the mounting arm 26 as will hereinafter be described in detail.

An interconnection means in the form of a spring-loaded hinge 54 has one of its leaves 56 mounted on the plate 36 of the mirror bracket 24 with its other leaf 57 being attached transversely to the mounting arm 26 approximately at the center thereof. The hinge axis of the hinge 54, defined by the longitudinal axis of the hinge body 58, is disposed at a 90° relationship with respect to the substantially vertical axis 38 provided by the piano hinge 28. The hinge axis of the spring-loaded hinge 54 provides the mirror assembly 10 with a substantially horizontal pivot axis 60 about which the mirror 12 and the mirror bracket 24 are pivotably movable as an entity as will be described.

The spring-loaded hinge 54 is of the well known type wherein its internal spring (not shown) will bias the leaves 56 and 57 so that they will extend substantially oppositely from the body 58 in an approximately flat plane. Such hinges are commercially available in most hardware stores with an example of a particular hinge suitable for this purpose being identified by the number 154, manufactured by the Stanley Hardware Co., a division of the Stanley Works, New Britton, Conn. 06050.

The mounting arm 26 includes a central portion 62 with an upper arm portion 63 extending integrally and angularly therefrom and a lower arm portion 64 extending integrally oppositely and angularly therefrom. The upwardly extending end of the upper arm portion 63 is bent over so as to provide a flange 66 which is normal to the mounting arm 26, and the downwardly extending end of the lower arm portion 64 is similarly provided with a flange 68. The flanges 66 and 68 are each provided with a hole 70 and those holes are in vertical alignment with each other along a second vertical pivot axis 72, for reasons which will hereinafter be described.

A first adjustable stop bolt 74 having a threaded shank 75 and a suitable jamb nut 76, is threadingly mounted in the upper arm portion 63 of the mounting arm 26 so as to be normal with respect thereto. The shank 75 extends from the mounting arm 26 toward the plate 36 of the mirror bracket 24. An identical second stop bolt 78 having a threaded shank 79 and a jamb nut 80 is threadingly mounted in the lower arm portion 64 of the mounting arm 26 so that its threaded shank extends normally from the mounting arm 26 toward the plate 36 of the mirror bracket 24.

With the stop bolts 74 and 78 being mounted as described above, they will lie on opposite sides, i.e., above and below, the spring-loaded hinge 54 and thus the horizontal pivot axis 60 defined thereby, as seen best in FIG. 4. Therefore, the adjustable stop bolts 74 and 78 are used to determine the amount of pivotable movement of the mirror 12 and the mirror bracket 24 about the horizontal axis.

Due to the spring bias applied to the mirror bracket 24, and thus to the mirror 12 by the spring-loaded hinge 54, the mirror and the mirror bracket will be normally biased to the solid line position, shown in FIG. 4, wherein the plate 36 of the mirror bracket 24 is in bearing engagement with the extending end of the shank 75 of the adjustable stop bolt 74.

Another switching means 82, which may be similar to the previously discussed switching means 50, as will hereinafter be described in detail, is mounted on the upper arm portion 63 of the mounting arm 26. The switching means 82 is normal with respect to the mounting arm 26 and its extensible plunger 84 extends from the mounting arm 26 toward the plate 36 of the mirror bracket 24. In FIG. 4, the switching means 82 is shown with its plunger 82 being the retracted position in solid lines. When retracted, the mirror 12 and the mirror bracket 24 will be biased, as described above, into its normal position. When the switching means 82 is actuated to the extended position of its plunger 84, dashed lines in FIG. 4, the plunger will move into bearing engagement with the mirror bracket 24 to pivotably move it, and the mirror 12, about the horizontal axis 60 to the dashed line position.

When the mirror assembly 10 is mounted on a vehicle (not shown) the flanges 66 and 68 of the mounting arm 26 are suitably attached to the vehicle so that the entire mirror assembly 10 is pivotably movable about the second vertical axis 72 defined by the mounting arm 26. With both of the switching means 50 and 82 in the retracted states thereof, the mirror 12 will be disposed in the solid line normal position, shown in FIG. 3, of rotation about the substantially vertical axis 60, and the mirror 12 and the mirror bracket 24 will be in the normal position of rotation about the horizontal axis 60, as shown in solid lines in FIG. 4. In this position, the mirror 12 will provide a first field of vision which is identified schematically as F1 in FIG. 1. By moving the entire mirror assembly 10 about the second vertical axis 72, the mirror assembly 10 is adjustably positioned so that the field of vision F1 is suitable for the particular viewing requirements of a vehicle and its operator.

When adjustably mounted on the vehicle in the above described manner, actuation of the switching means 50 to the extended state thereof, will pivotably move the mirror 12 about the substantially vertical axis 38 to the dashed line position shown in FIG. 3. This movement of the mirror 12 will provide the operator of the vehicle with a second field of vision which is identified schematically as F2 in FIG. 1.

When the switching means 82 is actuated, from the remote location of the vehicle's operator, to the extended position of its plunger 84, the mirror 12 and the mirror bracket 24 will be pivotally moved about the horizontal axis 60 in the manner described above. This will, of course, tilt the substantially vertical axis 38 from the solid line position to the dashed line position as shown in FIG. 4. When so moved, the mirror 12 will normally be located so as to provide the operator with a third field of vision indicated as F3 in FIG. 1. And, by actuation of the switching means 50 in the manner described above, the mirror 12 will be moved about the tilted substantially vertical axis 38 to provide a fourth field of vision F4.

It is to be understood that the vertical axis 38 hereinbefore referred to as being substantially vertical, may not be vertically disposed in either its normal or tilted positions, in that the attitudes of that axis will be determined by the adjusted positioning of the mirror assembly 10 to suit the viewing requirements. Therefore, the language of substantially vertical, or upright, is employed solely to distinguish that axis 38 from the substantially horizontal axis 60.

The switching means 50, which is hereinafter referred to as the first switching means, and the switching means 82, which is hereinafter referred to as the second switching means, may be of any several well known types. For example, they may be pneumatic devices in that many of the larger trucks for which the mirror assembly 10 is ideally suited, are provided with high pressure pneumatic systems. The switching means 50 and 82 may also be electric solenoids of the type which are normally retracted and are actuated to their extended positions. Also, the switching means may be of the type which require that they be actuated from their retracted positions to their extended positions and will remain in the extended positions until once again actuated. Switching devices of the above described types are old and well known in the art.

While the principles of the invention have now been made clear in the illustrated embodiment, there will be immediately obvious to those skilled in the art, many modifications of structure, arrangments, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A remote control multi-position rear view mirror for mounting on a vechicle comprising:

(a) a mirror having opposed reflective and non-reflective faces;
    (b) a bracket coupled to the non-reflective face of said mirror and defining a first axis about which said mirror is pivotably movable relative to said bracket between first and second positions;
    (c) biasing means for urging said mirror to its first position;
    (d) first actuator means being remotely actuatable between extended and retracted postions, said first actuator means establishing the first position of said mirror when in the retracted state and moving said mirror to its second position when actuated to its extended state;
    (e) first means on said bracket for establishing the second position of said mirror;
    (f) a mounting arm for attachment to the vehicle and being adjustable for establishing the position of the mirror relative to the vehicle;
    (g) interconnecting means coupling said mirror and said bracket to said mounting arm and defining a second axis about which said mirror and said bracket are movable as an entity between first and second positions, said interconnecting means being disposed so that the second axis defined thereby is at a right angle with respect to said first axis and includes means for biasing that entity to its first position;
    (h) second and third means on said mounting arm for respectively establishing the first and second positions of movement of said mirror and said bracket as an entity about said second axis; and
    (i) second actuator means being remotely actuatable between extended and retracted positions, said second actuator means moving said mirror and said bracket as an entity about said second axis to the second position thereof when said second actuator means is actuated to its extending state.

2. A remote control multi-position rear view mirror as claimed in claim 1 wherein said first means is adjustable so that the second position of movement of said mirror about said first axis may be adjusted.

3. A remote control multi-position rear view mirror as claimed in claim 1 wherein said first axis is in a substantially upright attitude when said mirror and said bracket are in the first position of movement about said second axis and is tilted from the substantially upright attitude when said mirror and said bracket are moved as an entity to the second position.

4. A remotely controlled multi-position rear view mirror as claimed in claim 3 wherein the second axis defined by said interconnection means is disposed to lie in a substantially horizontal attitude.

5. A remote control multi-position rear view mirror as claimed in claim 1 wherein said second and third means are both adjustable so that the first and second positions of rotation of said mirror and said bracket means may be adjusted.

6. A remotely controlled rear view mirror as claimed in claim 1 wherein said first actuator means has a movable plunger to provide the extended and retracted states thereof, said plunger being disposed to locate the first position of said mirror means when in the retracted state.

7. A remotely controlled rear view mirror as claimed in claim 1 wherein said interconnection means is a spring-loaded hinge.

8. A remotely controlled rear view mirror as claimed in claim 1 wherein said interconnection means is a spring-loaded hinge having one of its leaves attached to said bracket with its other leaf attached to said mounting arm.

9. A remotely controlled rear view mirror as claimed in claim 1 wherein said bracket comprises:
(a) a substantially planar plate having a flange formed at a right angle along one edge thereof; and
(b) and elongated hinge having one of its leaves attached to the non-reflective face of said mirror means with the other leaf thereof attached to the flange of said planar plate.

10. A remotely controlled rear view mirror as claimed in claim 9 wherein said hinge is a piano hinge.

11. A remotely controlled rear view mirror as claimed in claim 1 wherein said mirror means comprises:
(a) a reflective glass sheet;
(b) a rigid backing plate bonded to said reflective sheet;
(c) a peripheral gasket interposed between said reflective sheet and said rigid backing plate to provide a cavity therebetween; and
(d) heating element means in the cavity between said reflective glass sheet and said rigid backing plate.

12. A remotely controlled rear view mirror as claimed in claim 1 wherein said mounting arm has a central portion from which a pair of arm portions extend angularly and oppositely, each of said arm portions having a flange on its extending end, each of said flanges having a hole formed therethrough with the holes being in substantially vertical alignment with each other for mounting of said mounting arm on the vehicle and providing a pivot axis about which said mounting arm is adjustably movable.

13. A remote control multi-position rear view mirror for mounting on a vehicle comprising:
(a) a mirror having opposed reflective and non-reflective faces;
(b) a plate;
(c) hinge means interconnecting the non-reflective face of said mirror and said plate and defining a substantially upright axis about which said mirror is pivotably movable between first and second positions;
(d) biasing means for urging said mirror to its first position;
(e) first actuator means being remotely actuatable between extended and retracted states, said first actuator means being mounted on said plate for engaging siad mirror to establish the first position thereof when in the retracted state and for moving said mirror to its second position when actuated to its extended state;
(f) first means on said plate for establishing the second position of said mirror;
(g) a mounting arm for attachment to the vehicle and defining a substantially vertical pivot axis for adjustment of said mirror relative to the vehicle;
(h) a spring-loaded hinge means interconnecting said plate and said mounting arm and defining a substantially horizontal axis about which said mirror, said hinge means and said plate are pivotably movable as an entity between first and second positions, said spring-loaded hinge means biasing that entity to the first position thereof;
(i) second and third means on said mounting arm for respectively establishing the first and second positions of movement of said mirror, said hinge means and said plate as an entity about said horizontal axis; and
(j) second actuator means being remotely actuatable between extended and retracted states, said second actuator means being mounted on said mounting arm for moving said mirror, said hinge means and said plate as an entity to the second position of movement about the horizontal axis upon actuation of said second actuator means to its extended state.

14. A remote control multi-position rear view mirror claimed in claim 13 wherein said hinge means is in the form of an elongated piano hinge.

15. A remote control multi-position rear view mirror as claimed in claim 13 wherein said biasing means is in the form of a coil spring mounted to extend between said plate and said mirror means.

16. A remote control multi-position rear view mirror as claimed in claim 13 wherein said mirror means includes a rigid metallic backing plate and a heating element.

17. A remote control multi-position rear view mirror as claimed in claim 13 wherein said first and said second actuator means are normally in the retracted states thereof.

18. A remote control multi-position rear view mirror as claimed in claim 13 wherein said first and said second actuator means require actuation for movement from their extended to their retracted states and require another actuation for movement from their retracted to their extended states.

19. A remotely controlled four position rear view mirror for use on a vehicle comprising:
(a) a mirror means having opposed reflective and non-reflective faces;
(b) a mirror bracket mounted on the non-reflective face of said mirror and defining a first axis about which said mirror is pivotably movable relative to said mirror bracket;
(c) first actuator means having an extensible plunger;
(d) biasing means for holding said mirror in engagement with said plunger of said first actuator;
(e) said first actuator having a first state wherein said plunger is retracted to establish a first position of pivotable movement of said mirror abut said first axis, said first actuator being remotely actuatable to a second state wherein said plunger moves to an extended position for moving said mirror to a second position of pivotable movement about said first axis;
(f) movement limiting means for determining the second position of pivotable movement of said mirror about said fifth axis, said movement limiting means being disposed for engaging said mirror and stopping its movement at the second position upon actuation of said first actuator means to its second state;
(g) a mounting arm for adjustable mounting on the vehicle;
(h) interconnecting means coupling said mirror bracket to said mounting arm and defining a second axis about which said mirror and said mirror bracket are pivotably movable as an entity between first and second positions of pivotable movement about said second axis, said interconnecting means being disposed so that the second axis defined thereby is at a right angle relative to said first axis;

(i) second and third movement limiting means on said mounting arm for respectively establishing the first and second positions of pivotable movement of said mirror and said mirror bracket as an entity about said second axis;

(j) said interconnecting means including biasing means for yieldably urging said mirror and said mirror bracket as an entity into engagement with said third movement limiting means; and (k) second actuator means having an extensible plunger and being remotely actuatable to extendingly move its plunger into engagement with said mirror bracket to pivotably move said mirror and said mirror bracket as an entity about said second axis from engagement with said third movement limiting means into engagement with said second movement limiting means.

* * * * *